Nov. 3, 1942.                C. V. AGGERS                 2,300,853
           CONTROL CIRCUIT FOR GASEOUS ELECTRIC DISCHARGE LAMPS
                           Filed Oct. 31, 1940
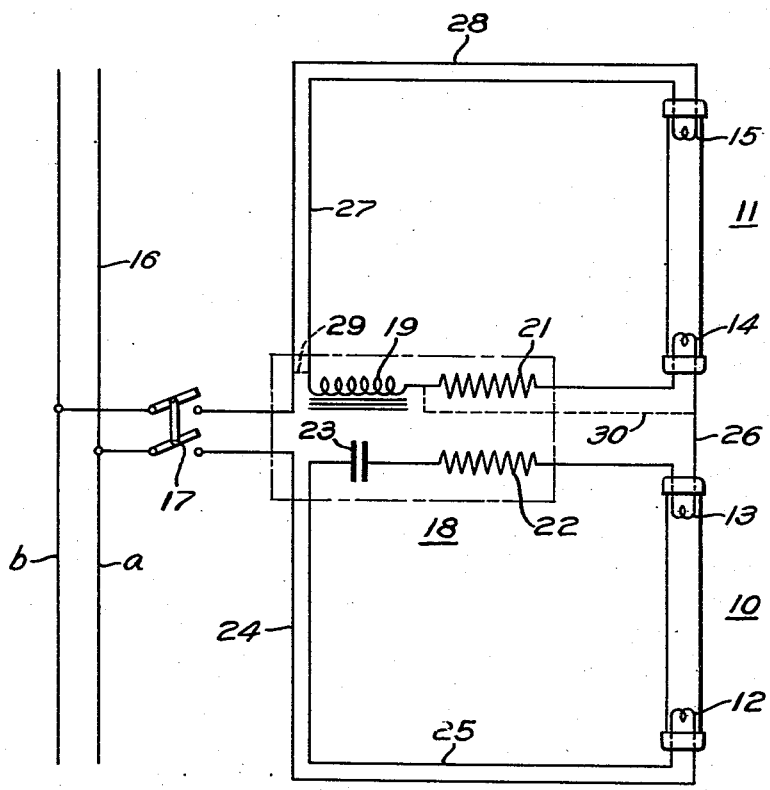
WITNESSES:                                            INVENTOR
                                                    Clair V. Aggers.
                                                   BY
                                                        ATTORNEY Patented Nov. 3, 1942

2,300,853

UNITED STATES PATENT OFFICE 2,300,853

CONTROL CIRCUIT FOR GASEOUS ELECTRIC DISCHARGE LAMPS

Clair V. Aggers, Great Neck, N. Y., assignor to Westinghouse Electric & Manufacturing Company, East Pittsburgh, Pa., a corporation of Pennsylvania Application October 31, 1940, Serial No. 363,720

6 Claims. (Cl. 176—124)

My invention relates, generally, to control circuits for gaseous electric discharge lamps, and more particularly, to a control circuit for controlling and operating a pair of such lamps from a single circuit.

Heretofore, it has been the practice to start and operate one gaseous discharge lamp, such, for example, as a fluorescent lamp, by means of a single circuit, the cathodes of the lamp being connected in series through a capacitor and a starting resistor having a negative temperature coefficient and across the source of power through a reactor. An arrangement of this kind has one disadvantage that it operates at a relatively low power factor of approximately fifty percent and has the further disadvantage that only one lamp is operated on each circuit.

Accordingly, it is the object of my invention, generally stated, to provide a control circuit for gaseous electric discharge lamps which shall be simple and efficient in operation and which shall operate at a relatively high power factor.

A more specific object of my invention is to provide for operating two gaseous discharge lamps on a single control circuit without the use of any appreciable amount of additional control equipment.

A further object of my invention is to provide for increasing the power factor of control circuits for gaseous discharge lamps while at the same time utilizing each control circuit to greater advantage.

Another object of my invention is to provide for starting and operating a pair of gaseous electric discharge lamps by means of a single control circuit containing only a single reactor device.

Still another object of the invention is to utilize the voltage drop across the starting reactor in a control circuit for a gaseous electric discharge lamp for starting a second lamp without the use of an additional reactor.

These and other objects of my invention will become apparent from the following detailed description when read in conjunction with the drawing in which the single figure is a diagrammatic view of a control circuit for gaseous discharge lamps embodying the principle features of my invention.

In practicing my invention in one of its exemplary forms, one gaseous discharge lamp is connected to the source through a reactor and the other gaseous discharge lamp is connected across the reactor to be subjected to the voltage thereof. The first discharge lamp has one terminal of each of its cathodes connected to the opposite sides of the source, the other terminals being connected in series through a capacitor and a silicon starting resistor. The cathodes of the other lamp are each connected in series with the reactor winding on opposite sides thereof and another silicon starting resistor is connected between the reactor winding and one of the cathodes. With this arrangement the second lamp is subjected to the voltage developed across the reactor during the period just after the circuit is energized and the effective resistance of the starting resistors is low, which is sufficient to ionize the gaseous element of the lamp and ignite or start it into operation.

With reference to the drawing, there is illustrated one embodiment of the invention as it may be applied for controlling the operation of a pair of gaseous discharge tubes or lamps of the fluorescent type requiring a high starting voltage as compared to the normal operating voltage of approximately sixty volts.

The arrangement shown comprises a pair of lamps 10 and 11 having electrodes or cathodes 12 and 13, and 14 and 15, respectively, which are to be operated by means of a single control circuit from the source of alternating current 16 which may be connected to the control circuit by the switch 17 when it is desired to start and operate the lamps.

The control elements of the circuit are designated, generally, by the numeral 18 and comprise a reactor 19, starting resistors 21 and 22 and a capacitor 23. In explaining and describing the operation of the circuit, it should first be pointed out that the primary purpose of the particular arrangement is to provide for operating two lamps by means of a single control circuit with considerably less control equipment that would be required for operating the two lamps by means of separate circuits.

In order to accomplish this result, generally, the lamp 10 is connected in series with the reactor 19 to the source 16 and the lamp 11 is connected across the reactor 19 in series with its starting resistor 21, as shown. The electrodes or cathodes 12 and 13 of the lamp 10 are connected together in series circuit relation through the starting resistor 22 and capacitor 23.

The resistors 21 and 22 may be of any well known type having a negative temperature coefficient so that their effective resistance to the flow of current decreases with increased temperature, such for example, as a silicon resistor. Before voltage is applied to the circuit by closure of switch 17, the effective resistance of the resistors is high and the current which initially flows in the circuit as the result of the closure of switch 17 is relatively low, being limited by the resistance of the circuit when the inductive and capacitive reactances are equal. As the resistors heat up their resistance gradually decreases which results in an increased flow of starting current.

The control circuit for the lamps extends from conductor a of the source, through the lower blade of switch 17, conductor 24, electrode 12 of lamp 10, conductor 25, capacitor 23, starting resistor 22, electrode 13 of the same lamp, conductor 26, electrode 14 of the other lamp 11, starting resistor 21, reactor 19, conductor 27, electrode 15, conductor 28 and through the upper blade of the switch to conductor b of the source.

It will be apparent that by means of these circuit connections, the increased flow of starting current through the capacitor 23 finally produces a voltage of sufficient magnitude to break down or ionize the gaseous content of the lamp 10 which initiates the operation thereof.

The other lamp 11 is in effect connected across the reactor 19 in series with its starting resistor 21 and is thereby subjected to the voltage drop across the reactor produced by the increased flow of starting current therein. This voltage is also of sufficient magnitude as to ionize the gaseous element of the lamp 11 thereby causing it to be ignited or started into operation.

The starting resistors are so designed that after the lamps have been ignited the flow of current in their respective starting circuits is reduced or limited to a very much lower value of the order of about one twentieth the initial value for starting and likewise the voltages across the lamps are reduced to the normal operating value of about sixty volts.

This results from the fact that, when the lamps are ignited and a discharge occurs between their electrodes, the current flows through the path of the least resistance which is the discharge circuit of the lamps. Since the current is diverted from those portions of the circuit including the starting resistors, these resistors cool off and their resistance again increases.

Thus it is apparent that the additional lamp 11 may be started and operated on the same circuit as lamp 10 by the use only of another starting resistor 21, similar to the resistor 22, which may be provided at a small additional cost.

Another important advantage of the arrangement described is that of increased power factor of the circuit as compared to a single lamp per circuit arrangement where the left hand terminal of the reactor 19 would be connected directly to the upper blade of the switch 17 and the righthand terminal thereof directly to the conductor 26, as indicated by the dashed lines 29 and 30. The present circuit operates close to unity power factor whereas a circuit with only a single lamp operates at approximately fifty percent power factor. This results from the fact that the reactive KVA of the reactor 19 is approximately the same as that of the capacitor 23 under normal operating conditions. After the lamps start, the voltage across the reactor 19 will be approximately the same as that across the condenser 23 as the reactance of these two devices is made approximately equal. Therefore the inductive volt amperes will be the same as the capacitive volt amperes and approximately unity power factor operation of the circuit is obtained.

In view of the foregoing, it will be apparent that my invention provides for operating two gaseous electric discharge lamps from a single supply and control circuit with a minimum amount of additional equipment over that required for operating a single lamp, the only additional equipment required being a relatively inexpensive starting resistor and that the system of my invention operates at greatly increased, approximately unity, power factor.

It is to be understood that the exemplary embodiment of my invention is merely illustrative and that various changes and modifications might be made without departing from the principles of the invention as defined by the appended claims.

I claim as my invention:

1. In combination, a source of alternating current supply, first and second gaseous electric discharge devices connected in series to said source, a capacitor and a starting resistor connected across said first discharge device, and a reactor and a second starting resistor connected across said second discharge device.

2. A circuit for controlling and operating a pair of gaseous discharge lamps from a source of alternating current comprising, a first gaseous discharge lamp having its cathodes connected together through a capacitor and a resistor, and a second gaseous discharge lamp having its cathodes connected together through a reactor in series with a second resistor, and circuit means connecting said lamps in series to the source, whereby the voltage developed across the reactor is effective to ignite said second lamp.

3. A circuit for starting and operating a pair of gaseous electric discharge lamps from a source of alternating current power comprising, first and second gaseous electric discharge devices, said devices each having a pair of cathodes, circuit means for connecting the cathodes of both devices in series circuit relation to the power source, a reactor and a starting resistor connected across the cathodes of the first device, and a capacitor and a second starting resistor connected across the cathodes of the second device, whereby both of said devices are started and operated on a single circuit containing only a single reactor.

4. The combination with an alternating current source, of a reactor, a pair of gaseous electric discharge devices each having a pair of electrodes, one terminal of each of the electrodes of one device being connected together through a capacitor and a starting resistor, the other terminal of one electrode of the said device being connected to the source, the other terminal of the other electrode of the said device being connected to one terminal of one electrode of the other device, the other terminal of said electrode being connected in series with a second starting resistor, the reactor and the other electrode of the other device to the source, thereby to provide for operating both of said devices on a single circuit from the source.

5. A starting and control circuit for gaseous electric discharge lamps comprising, first and second gaseous electric discharge lamps each having a pair of cathodes, a reactor, circuit means for connecting the cathodes of the discharge lamps in series circuit relation with the reactor to a current source, the winding of said reactor being disposed between the cathodes of the first discharge device whereby the said first discharge device is subjected to the voltage developed across the reactor, a starting resistor having a negative temperature coefficient connected in series with the reactor between the cathodes of the said first discharge device, and a second starting resistor having a negative temperature coefficient and a capacitor connected between and in series with the cathodes of the second discharge device, thereby to provide for operating the two discharge devices on a single circuit.

6. A circuit for controlling and operating a pair of gaseous electric discharge lamps from a source of alternating current comprising, circuit means including a capacitor and a starting resistor having a negative temperature coefficient connecting the cathodes of one of the lamps together, a reactor connected in series circuit relation with said lamp through the cathodes of the other lamp to the source, and a second starting resistor having a negative temperature coefficient connected in series circuit relation with the reactor between the cathodes of said other lamp, said reactor and said capacitor having substantially the same reactance, whereby the circuit operates at approximately unity power factor.

CLAIR V. AGGERS.